US011085521B2

(12) United States Patent
Edwards et al.

(10) Patent No.: US 11,085,521 B2
(45) Date of Patent: Aug. 10, 2021

(54) AUXILIARY OIL SUPPLY APPARATUS FOR A ROTATING COMPONENT

(71) Applicant: ROLLS-ROYCE plc, London (GB)

(72) Inventors: David A. Edwards, Derby (GB); David P. Scothern, Derby (GB)

(73) Assignee: ROLLS-ROYCE plc, London (GB)

( * ) Notice: Subject to any disclaimer, the term of this patent is extended or adjusted under 35 U.S.C. 154(b) by 447 days.

(21) Appl. No.: 16/059,370

(22) Filed: Aug. 9, 2018

(65) Prior Publication Data

US 2019/0078680 A1 Mar. 14, 2019

(30) Foreign Application Priority Data

Sep. 8, 2017 (GB) ...................................... 1714466

(51) Int. Cl.
*F16N 7/16* (2006.01)
*F16N 7/36* (2006.01)
(Continued)

(52) U.S. Cl.
CPC ..... *F16H 57/0442* (2013.01); *F16H 57/0427* (2013.01); *F16H 57/0482* (2013.01); *F16N 7/16* (2013.01); *F16N 7/363* (2013.01); *F16N 25/04* (2013.01); *F01D 25/18* (2013.01); *F02C 7/36* (2013.01); *F05D 2260/40311* (2013.01); *F05D 2260/98* (2013.01); *F05D 2270/304* (2013.01);
(Continued)

(58) Field of Classification Search
CPC ............. F16H 57/0442; F16H 57/0427; F16H 57/0482; F16H 57/0423; F16N 25/04; F16N 7/363; F16N 7/14; F16N 7/16; F01D 25/18; F16C 33/10

USPC ........................................ 184/53, 6.11, 11.4
See application file for complete search history.

(56) References Cited

U.S. PATENT DOCUMENTS

| 874,883 A | 12/1907 | Clarke |
|---|---|---|
| 2,795,155 A | 6/1957 | Bade |

(Continued)

FOREIGN PATENT DOCUMENTS

| EP | 3187700 A2 | 7/2017 |
|---|---|---|
| GB | 210501 | 1/1924 |
| GB | 947789 A | 1/1964 |

OTHER PUBLICATIONS

Response to Communication pursuant to Article 94(3) EPC from counterpart EP Application No. 18187964.4 dated Apr. 21, 2020, filed Jun. 12, 2020, 33 pgs.

(Continued)

*Primary Examiner* — Michael R Mansen
*Assistant Examiner* — Mark K Buse
(74) *Attorney, Agent, or Firm* — Shumaker & Sieffert, P.A.

(57) ABSTRACT

An auxiliary oil supply apparatus for a rotating device (50, 51), the rotating device comprising a primary oil supply (52), a rotating component (50) and a static component (51) situated radially outwardly of a centre of rotation of the rotating component (50) and arranged to collect oil (58) held radially outwardly from the rotating component (50) as the rotating component rotates. The auxiliary oil apparatus comprises a scoop (56) associated with the rotating component (50) and is responsive to a change in a known parameter to move between a first position in the static component (51) to a second position between the static component (51) and the centre of rotation.

18 Claims, 5 Drawing Sheets

(51) Int. Cl.
    *F16H 57/04*     (2010.01)
    *F16N 25/04*     (2006.01)
    *F02C 7/36*     (2006.01)
    *F01D 25/18*     (2006.01)

(52) U.S. Cl.
    CPC ...... *F05D 2270/58* (2013.01); *F16H 57/0423* (2013.01); *F16H 57/0479* (2013.01)

(56) References Cited

U.S. PATENT DOCUMENTS

| | | | | |
|---|---|---|---|---|
| 3,673,743 | A * | 7/1972 | Giardini | B24B 41/04 451/342 |
| 3,712,154 | A * | 1/1973 | Welch | F16H 47/085 475/47 |
| 4,541,737 | A * | 9/1985 | White | F16N 7/16 384/406 |
| 6,446,755 | B1 | 9/2002 | Varailhon et al. | |
| 2002/0175026 | A1 | 11/2002 | Varailhon et al. | |
| 2015/0308351 | A1 | 10/2015 | Sheridan | |
| 2015/0354407 | A1 * | 12/2015 | Anglin | F16N 7/00 188/82.77 |
| 2016/0281527 | A1 * | 9/2016 | Lucas | F01D 17/06 |
| 2017/0191378 | A1 * | 7/2017 | Moniz | F01D 25/20 |

OTHER PUBLICATIONS

Communication pursuant to Article 94(3) EPC from counterpart EP Application No. 18187964.4 dated Apr. 21, 2020, 6 pgs.
Great Britain Search Report dated Feb. 1, 2018, issued in GB Patent Application No. 1714466.8.
Extended European Search Report from EP counterpart application No. 18187964.4, dated Jan. 23, 2019, 10 pgs.
Response to the Extended European Search Report from EP counterpart application No. 18187964.4, dated Jan. 23, 2019, filed Jun. 14, 2019, 34 pgs.

* cited by examiner

AUXILIARY OIL SUPPLY APPARATUS FOR A ROTATING COMPONENT

CROSS-REFERENCE TO RELATED APPLICATIONS

This application is based upon and claims the benefit of priority from British Patent Application No. GB 1714466.8, filed on 8 Sep. 2017, the entire contents of which are incorporated by reference.

BACKGROUND

Technical Field

The present disclosure concerns supply of oil to a component of rotating device. In one practical application, the rotating device may be an epicyclic gear arrangement.

Description of the Related Art

Centrifugal forces in such rotating devices can force oil to collect radially outwardly of a component to which the oil has been provided. It may be desirable to scavenge and recycle this collected oil to other component surfaces of the rotating device.

Epicyclic gear arrangements in general include three gear train elements: a central sun gear, an outer ring gear with internal gear teeth, and a plurality of planet gears between and in meshed engagement with both the sun gear and the ring gear. The gear train elements share a common longitudinal central axis, about which at least two of the gear train elements rotate. Such arrangements are known to be used for speed reduction transmission between an engine core and a fan of a gas turbine engine. In some such arrangements (known as planetary gear boxes) the sun gear is arranged to receive rotary input from the engine core while the outer ring gear is fixed. The planet gears precess around the common longitudinal central axis. A carrier is used to transmit this precession to an output shaft, typically driving a fan drive shaft. The planet gear carrier rotates in the same direction as the sun gear to provide torque output at a reduced rotational speed.

Rotation of the planet carrier means that the bearings on which the planet gears are mounted must carry the centrifugal weight of the planet gears. During in flight operations a primary oil management system delivers appropriate lubrication to these bearings and other components and interfaces of the gear box. Such primary oil management systems may rely on a power source, for example to pump the lubricant to the required location or to operate a control system which selectively delivers the lubricant. However, such arrangements cannot be relied upon in the event of an in-flight shutdown, or an oil system failure. An auxiliary oil supply is needed to maintain oil feed to the bearings, other components and interfaces to prevent fan seizure. The auxiliary oil supply may redistribute and recycle oil delivered by the primary oil supply. Alternatively, the auxiliary oil supply may circulate oil from a source other than the primary oil supply system.

SUMMARY

The present disclosure provides an auxiliary oil supply apparatus for a rotating device, the rotating device comprising a primary oil supply system, a rotating component and a static component situated radially outwardly of a centre of rotation of the rotating component and arranged to collect oil forced radially outwardly from the rotating component as the rotating component rotates, the auxiliary oil system comprising a scoop associated with the rotating component and responsive to a change in a known parameter to move between a first position in the static component to a second position between the static component and the centre of rotation.

The static component may encircle the rotating component. In an alternative, the static component may comprise a trough arranged below the centre of rotation of the rotating component arranged for collecting excess oil pooling under gravity.

The parameter may be the rotational speed of the rotating component, the parameter having two identifiable conditions, the first condition corresponding to a first rotational speed range of the rotating component and the second condition corresponding to a second rotational speed range of the rotating component. The first rotational speed range may correspond to the rotating component being power driven and the second rotational speed range may correspond to the rotating component windmilling.

In some embodiments, the scoop is pivotally mounted to the rotating component and is balanced by a counterweight. The counterweight may be selected to move radially outwardly of the centre of rotation under centrifugal forces generated during the second condition and radially inwards during the second condition and causing the scoop to move radially inwards to the second position in the first condition and radially outwards to the first position in the second condition.

The scoop may be in fluid communication with an element of the rotating component. As the rotating component carries the scoop in rotation, oil is collected from the gutter and can be delivered through the hose to the element as the device rotates.

The apparatus may further comprise a retractor device associated with the scoop arm for returning the scoop arm from the second position to the first position whereby to deliver oil scooped from the gutter to an element of the rotating component. For example, but without limitation, the element may be a bearing or gear mesh interface. The retractor device may have an equilibrium position at which the scoop arm is held in the first position. For example, but without limitation, the retractor device is selected from; a torsion spring, a tension spring, a compression spring, a hydraulic actuator or a pneumatic actuator.

In some embodiments, the parameter is the pressure of oil in the primary oil supply, this parameter having two identifiable conditions, the first condition corresponding to a first oil pressure range in the primary oil supply and the second condition corresponding to a second oil pressure range in the primary oil supply. For example, the primarily oil supply may be in fluid communication with a piston slidably engaged in a cylinder arranged such that the piston moves within the cylinder responsive to pressure changes in the primary oil supply. The scoop is connected to the piston in such a way that movement of the piston causes the scoop to move between the first position and the second position.

Where the parameter is oil pressure in the primary oil supply, the first oil pressure range may correspond to situations where the primary oil supply is active (for example it's supply is driven by a pump) and the second oil pressure range may correspond to a second condition where the primary oil supply is inactive (for example, the pump loses power).

In alternative embodiments, the apparatus comprises a sensor for monitoring the oil pressure in the primary oil supply and an actuator associated with the sensor, the actuator responsive to move the scoop arm from the first position to the second position when the sensor detects a change from the first condition to the second condition and/or the second condition to the first condition. For example, the actuator may be electro-mechanical, hydraulic or pneumatic.

In some practical embodiments, the rotating device is a component of an epicyclic gear box. The gear box may be a planetary gear box, the ring gear being fixed and the planet gears free to precess around the common longitudinal central axis. The rotating component may be a planet carrier for the planet gears. For example, but without limitation, the epicyclic gear box may be arranged axially between a turbine shaft and fan shaft of a gas turbine engine whereby to provide a speed reduction transmission from the turbine shaft to the fan shaft. In an example, the apparatus may be used to ensure continuous supply of oil to the bearings of the planet gears during conditions where power supply to drive the input shaft and/or pump oil in the primary oil supply has been restricted or cut-off.

Thus, in a specific embodiment, the rotating device comprises a planet carrier of an epicyclic gear box, the epicyclic gear box having a static gutter arranged radially distant from a centre of rotation of the gear box along a common longitudinal central axis. The static gutter may encircle the gear box.

For example, the epicyclic gear box comprises three gear train elements;
a central sun gear, an outer ring gear with internal gear teeth, and a plurality of planet gears between and in meshed engagement with both the sun gear and the ring gear; the gear train elements sharing a common longitudinal central axis, about which at least two of the gear train elements rotate;
each planet gear mounted for rotation by means of a bearing.
a primary oil supply system for feeding the planet gear bearings during a first condition; the auxiliary oil supply system for feeding the planet gear bearings during a second condition wherein, in use, oil supplied by the primary oil system collects in the static gutter.

The auxiliary oil supply system may comprise;
one or more pivots secured to the carrier or another rotating component of the epicyclic gear box;
a scoop arm extending from the pivot and movable between the first position during a first condition of the known parameter and the second position during a second condition of the known parameter.

The carrier may transmit torque from the precessing planet gears to an output shaft, for example a fan shaft of a gas turbine engine. The gear box may be arranged, in use, to provide a speed reduction transmission between a turbine shaft and the fan drive shaft in a gas turbine engine.

In embodiments where the first and second conditions correspond to first and second rotational speed ranges of the gear, higher rotational speeds may correspond to the input shaft to the gear box being power driven and lower rotational speeds to a condition where the power supply is cut and components coupled by the gear box are windmilling. A counter weight may be provided extending from the pivot in a direction opposite to the scoop arm. The counterweight may be selected by comparison to the power driven rotational speeds such that, at these speeds the resulting centrifugal force on the counterweight pushes the counterweight to a radially outward extreme. The counterweight is positioned with respect to the scoop arm such that, when the counterweight is at its radially outer extreme the scoop arm is in a retracted position (the first position). As the rotational speed reduces, the centrifugal force on the counterweight drops and the counterweight moves radially inwards towards a radially inner extreme. The counterweight is positioned with respect to the scoop arm such that, when the counterweight is at its radially inner extreme the scoop arm is in an extended position (the second position) in the gutter.

The apparatus may include a retractor device which is configured to return to an equilibrium position drawing the scoop arm back to the first position whereby to deliver collected oil to the bearing. For example, the retractor device is a spring which is arranged to be placed in tension by the counterweight at its radially inner extreme. As the spring returns to equilibrium, the scoop arm is drawn radially inwardly. In an alternative, the retractor device is a hydraulic or pneumatic device. In another alternative the retractor device may comprise an electro-mechanical device responsive to a sensor which is monitoring the parameter.

DESCRIPTION OF THE DRAWINGS

Embodiments will now be described by reference to the accompanying Figures in which.

DETAILED DESCRIPTION

Figure 1:
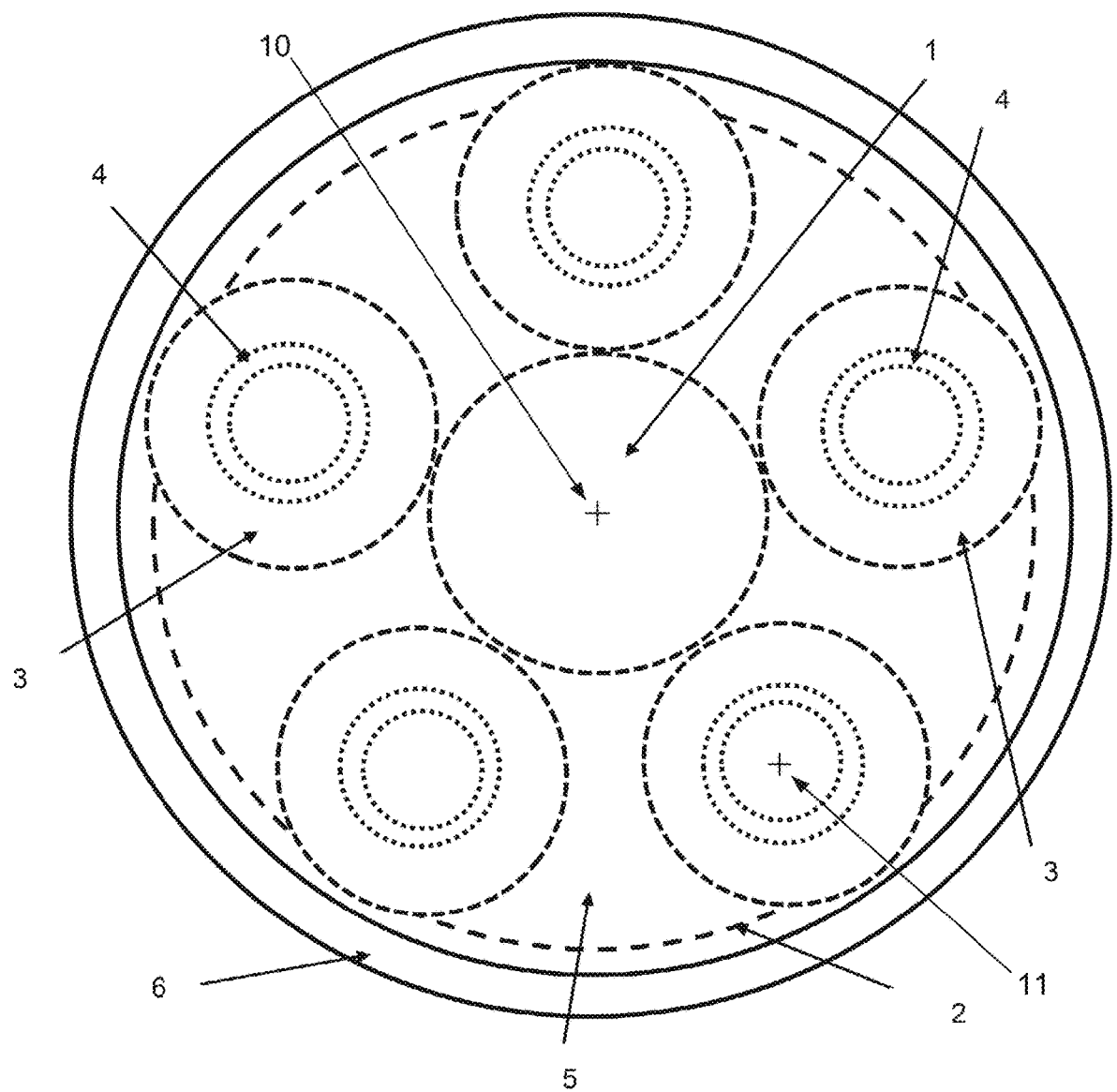
FIG. 1 shows a schematic of an epicyclic gear box as is known from the prior art.

FIG. 1 shows a schematic arrangement of an epicyclic gear box. As can be seen, the gear box comprises a sun gear 1, in coaxial and radial alignment with a ring gear 2, which both rotate around a center of rotation 10. An array of planet gears 3 are provided in a radial space between an outer diameter of the sun gear 1 and an inner diameter of the ring gear 2. The planet gears 3 each mesh with the sun gear 1 and the ring gear 2. Each planet gear 3 is mounted on a bearing 4. A center or rotation 11 of one of planet gears 3 is shown in FIG. 1. The gear arrangement is enclosed by a plate 5 of a planet carrier (not shown). Radially outwardly of the ring gear 2 is a gutter 6. In use, the sun gear 1 is driven in rotation by an input shaft (not shown).

Figure 2:
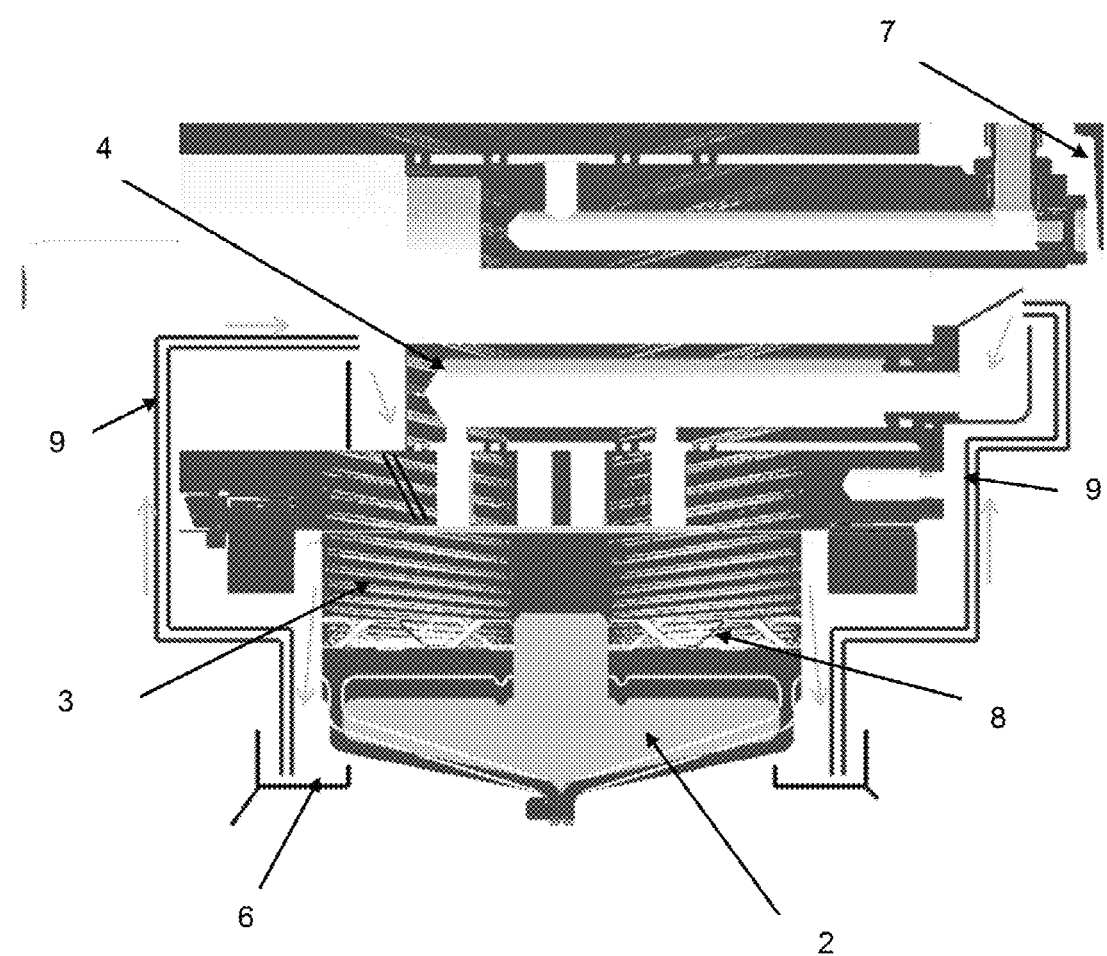
FIG. 2 shows an alternative view of an epicyclic gear box known from the prior art.

FIG. 2 shows a sectional view of a gear box similar to that shown in FIG. 1. The gear box is a planetary gear box. The figure includes a partial section of one planet gear 3 in meshing engagement with the ring gear 2. The planet gear 3 is mounted on a bearing 4. The ring gear 2 is fixed and the planet gears 3 are free to precess around the sun gear (not shown). The figure also shows an arm 7 of a planet carrier which transmits torque from the planet gears 3 to an output shaft (not shown). The meshing surfaces 8 of the gears and the rollers of bearing 4 require continuous lubrication to prevent seizure of the gear box. A primary oil supply circuit 9 delivers lubricating oil to the required locations. Excess oil may drain into the gutters 6 which serve as an oil sump.

The gear box may form part of a transmission reduction device between a turbine shaft and a fan shaft in a geared turbofan engine. During some operations of the engine oil may be pumped from the sump 6 back to the required locations. At times, power to actively pump oil from the sump may be limited or unavailable, however there may be a continued requirement during such times for the fan to continue to rotate. To prevent seizure, the gear box must be continually lubricated even in the absence of a power supply.

Figure 3:
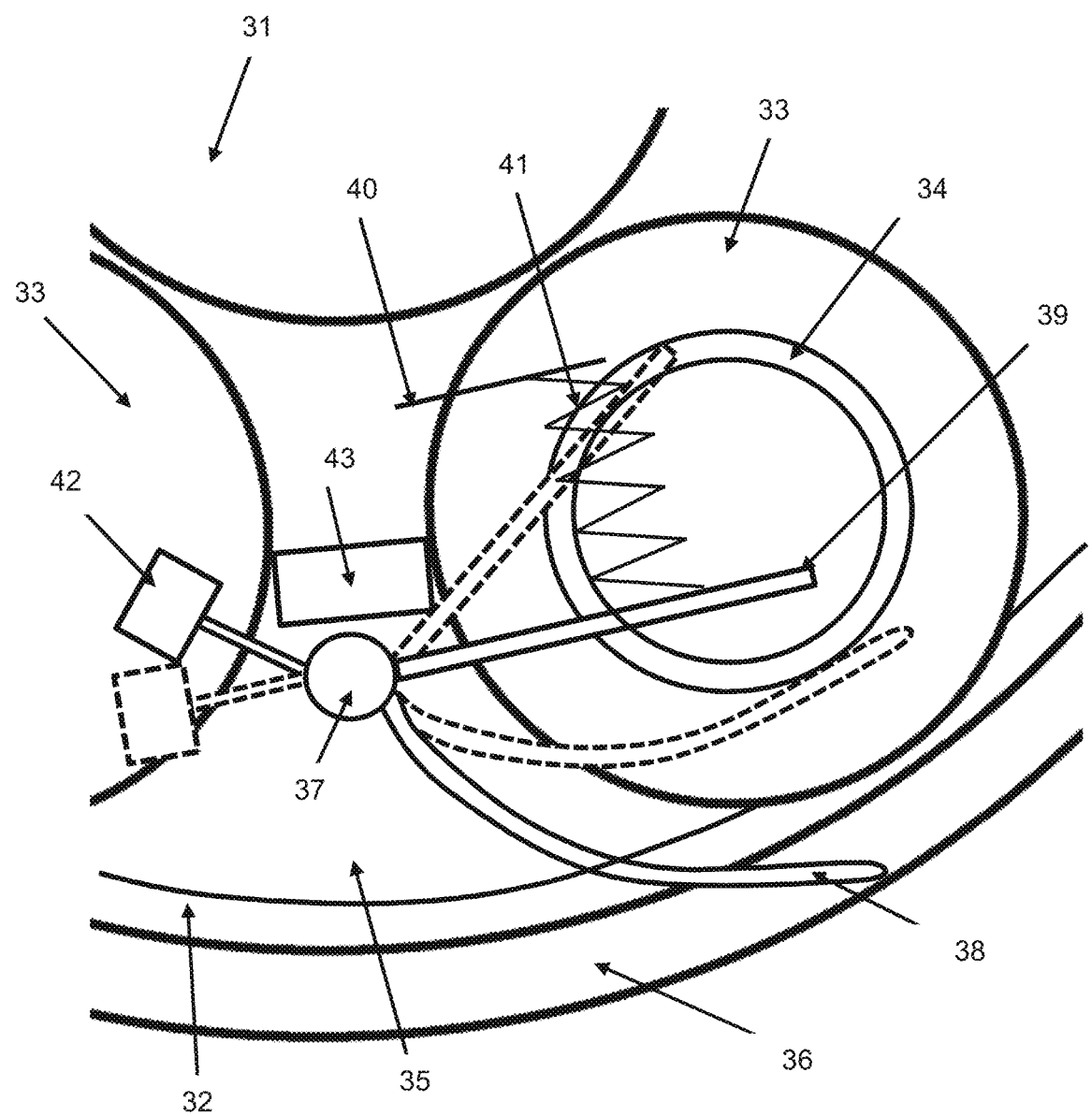
FIG. 3 shows a first embodiment of an epicyclic gear box including an auxiliary oil supply apparatus according to the present disclosure.

FIG. 3 shows a first embodiment of the invention. The Figure shows a transparent partial section of a planetary gear box having a sun gear 31, a ring gear 32 and an array of planet gears 33 in a radial space between the sun gear 31 and ring gear 32 and each in meshing engagement with the sun gear 31 and ring gear 32. The ring gear 32 in the arrangement shown is fixed allowing the planet gears 33 to precess around a common longitudinal central axis of the three gear trains. The gear trains are at least partially enclosed by a plate 35 which may in turn form part of a planet carrier transmitting torque to an output shaft (not shown). A gutter 36 serves as an oil sump at a radially outer extreme of the gear box.

On a face of the plate 35 is mounted a pivot 37 which carries a scoop 38 arranged to pivot between a first position (shown in dotted line) where it sits adjacent the bearing 34 and a second position (shown in solid outline) where it sits in the gutter 36. An arm 39 is also carried by the pivot 37 and is fixed in relation to the scoop 38. A mount 40 is secured to the plate 35 and a spring 41 is secured at a first end to the mount 40 and at a second end to the arm 39. A counter weight 42 for the scoop 38 and arm 39 extends in an opposite direction from the pivot 37. A stop 43 is provided on the cover plate 35 and prevents over-rotation of the arm 39 and the counter weight 42, and dampens the spring 41.

During much of the engine cycle, centrifugal forces in the gear box are such as to force the counter weight 42 radially outwardly compressing the spring 41 and pulling the scoop 38 into the first position (represented by the dotted outline), that is a position where it is retracted adjacent the bearing 34. At slower speeds, the force on the counter weight 42 is reduced causing it to drive the pivot clockwise extending the scoop 38 outwards and into the gutter 36 whilst placing the spring 41 in tension. As the spring 41 returns to equilibrium, the scoop 38 collects oil from the gutter 36 and flings it back towards the bearing 34. Thus, the arrangement is reactive to a reduction in the speed of rotation of the input shaft to cause the auxiliary oil system to supply oil to the bearing.

It will be appreciated that the described embodiment could be adapted to any rotating device and is not strictly limited to a planetary gear box.

Figure 4:
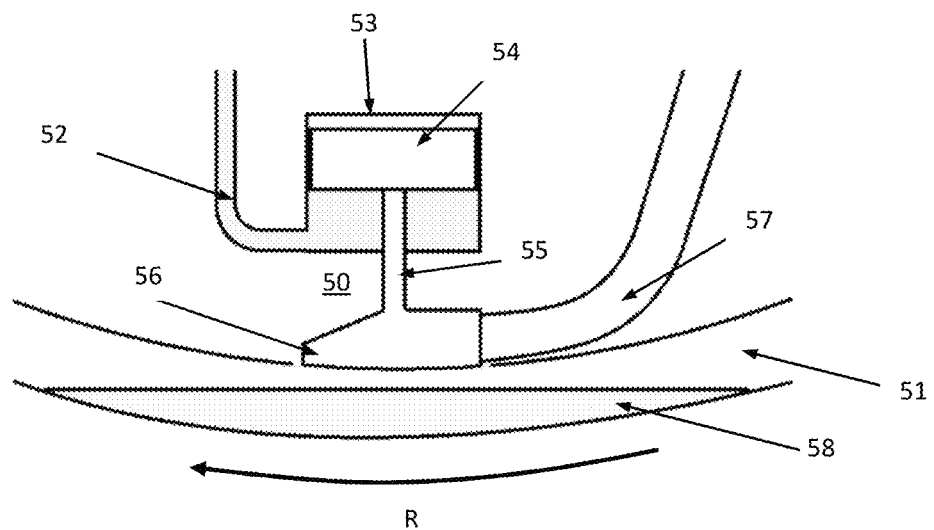
FIG. 4 shows a rotating device including an auxiliary oil supply apparatus according to the present disclosure.
Figure 5:
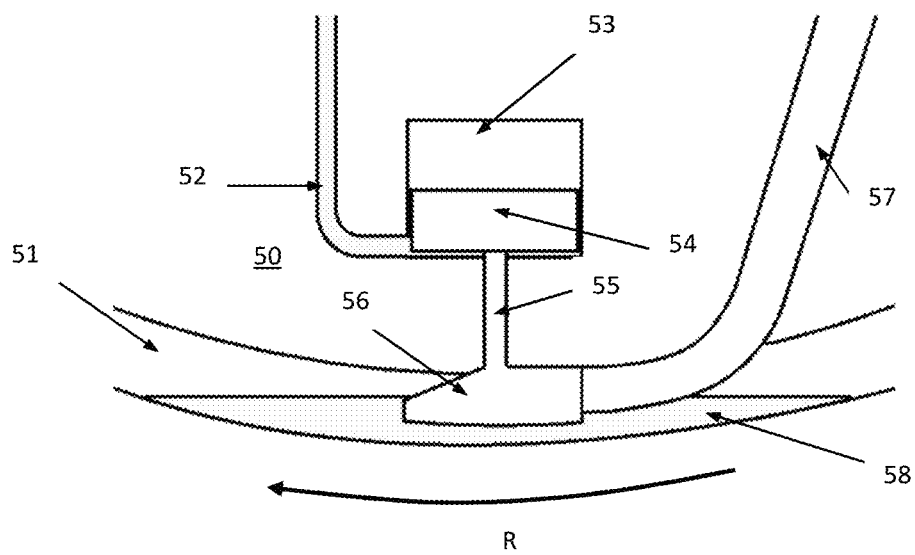
FIG. 5 shows the embodiment of FIG. 4 during a different primary oil supply pressure condition.

In the embodiment of FIGS. 4 and 5 a rotating device comprises a rotating component 50 encircled by a static component 51. The arrow R represents the direction of rotation of the rotating component 50. The static component 51 defines a gutter around the rotating component 50. A primary oil circuit 52 provides oil to the rotating component 50 during a first operating condition of the rotating device. The oil pressure in the primary oil circuit 52 changes between the first operating condition of the rotating device and a second operating condition of the rotating device.

FIG. 4 shows a condition where the pressure in the primary oil system 52 is relatively high. The primary oil system circuit includes a cylinder 53 in which a piston 54 is slidably received. In this condition, the oil pressure acts on the piston 54 forcing it into the cylinder 53. The piston 54 connects via a connecting rod 55 to a scoop 56. The scoop 56 is in fluid communication with a hose 57. During this condition, the scoop 56 is held radially inwardly of the static component 51. Rotation of the rotating device 50 leads to an accumulation of oil 58 in the gutter of the static component 51.

FIG. 5 shows a condition where the pressure in the primary oil system is relatively low by comparison to the pressure in the previously described condition of FIG. 4. As a consequence of the reduced pressure, the piston 54 is drawn out of the cylinder 53. The cylinder 53, piston 54 and scoop 56 is arranged such that, as the piston moves outwardly, the scoop 56 enters the gutter in the static component 51 and into the accumulated oil 58. As the rotating component 50 continues to rotate in direction R, oil 58 from the gutter is collected by the scoop 56 and into the hose 57. The hose 57 can redirect the scavenged oil to an element of the rotating component 50 radially inward of the static component 51.

Figure 6:
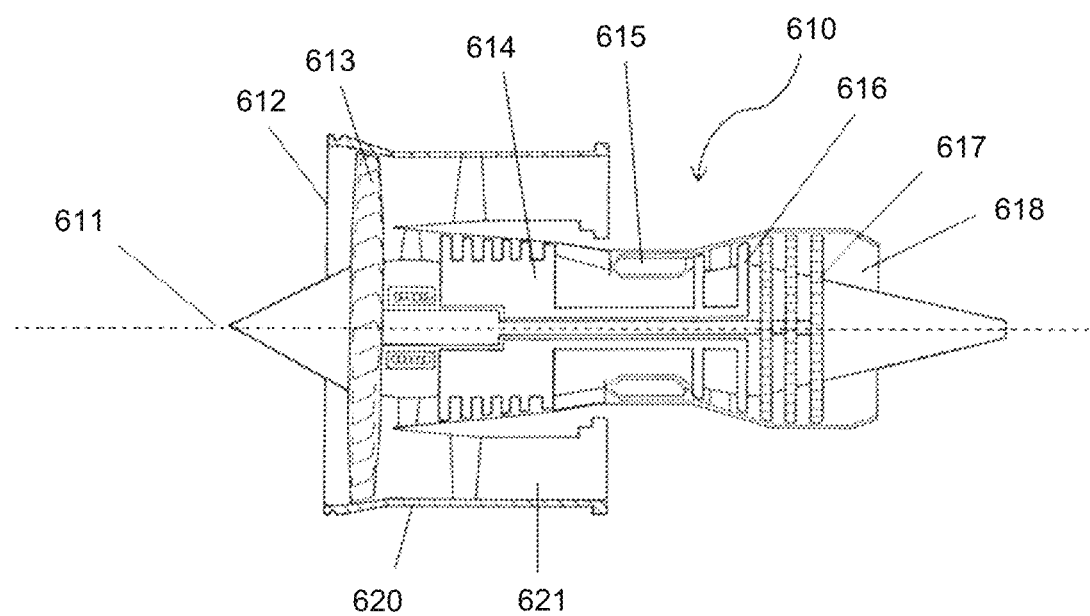
FIG. 6 is a sectional side view of a gas turbine engine into which an epicyclic gear box and auxiliary oil supply apparatus in accordance with the disclosure may be incorporated.

With reference to FIG. 6, a gas turbine engine is generally indicated at 610, having a principal and rotational axis 611. The engine 610 comprises, in axial flow series, an air intake 612, a propulsive fan 613, a high-pressure compressor 614, combustion equipment 615, a high-pressure turbine 616, a low-pressure turbine 617 and an exhaust nozzle 618. A nacelle 620 generally surrounds the engine 610 and defines the intake 612.

The gas turbine engine 610 works in the conventional manner so that air entering the intake 612 is accelerated by the fan 613 to produce two air flows: a first air flow into the high-pressure compressor 614 and a second air flow which passes through a bypass duct 621 to provide propulsive thrust. The high-pressure compressor 614 compresses the air flow directed into it before delivering that air to the combustion equipment 615.

In the combustion equipment 615 the air flow is mixed with fuel and the mixture combusted. The resultant hot combustion products then expand through, and thereby drive the high and low-pressure turbines 616, 617 before being exhausted through the nozzle 618 to provide additional propulsive thrust. The high 616 and low 617 pressure turbines drive respectively the high pressure compressor 614 and the fan 613, each by suitable interconnecting shaft.

For example, an epicyclic gear box incorporating an auxiliary oil system in accordance with the present disclosure may be provided in the common shaft which carries between the low pressure turbine 517 and the fan 513 so as to provide a speed reduction transmission from the low pressure turbine 517 to the fan 513.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An assembly comprising:
a rotating device, comprising:
a primary oil supply;
a rotating component; and
a static component situated radially outwardly of a center of rotation of the rotating component and arranged to collect oil held radially outwardly from the rotating component as the rotating component rotates;
an auxiliary oil apparatus for supplying oil to the rotating component, the auxiliary oil apparatus comprising:
a scoop associated with the rotating component and responsive to a change in a known parameter to move between a first position in the static component to a second position between the static component and the center of rotation of the rotating component, wherein the known parameter is a rotational speed of the rotating component, the known parameter having two identifiable conditions, the first condition corresponding to a first rotational speed range of the rotating component and the second condition corresponding to a second rotational speed range of the rotating component.

2. The assembly as claimed in claim 1, wherein the first rotational speed range corresponds to the rotating component being power driven and the second rotational speed range corresponds to the rotating component not being power driven.

3. The assembly as claimed in claim 1, wherein the scoop is pivotally mounted to the rotating component and balanced by a counterweight, the counterweight selected to move radially outwardly of the center of rotation under centrifugal forces generated during the second condition, and radially inwards during the first condition and causing the scoop to move radially inwards to the second position in the first condition and radially outwards to the first position in the second condition.

4. The assembly as claimed in claim 1, wherein the scoop is in fluid communication with a hose, the hose being in fluid communication with an element of the rotating component to which oil is required to be delivered.

5. The assembly as claimed in claim 1, further comprising a retractor device associated with the scoop for returning the scoop from the second position to the first position whereby to deliver oil scooped from the static component to an element of the rotating component.

6. The assembly as claimed in claim 5, wherein the retractor device has an equilibrium position at which the scoop is held in the first position.

7. The assembly as claimed in claim 5, wherein the retractor device is selected from: a torsion spring, a tension spring, a compression spring, a hydraulic actuator or a pneumatic actuator.

8. The assembly as claimed in claim 1, wherein the oil collected in the static component is oil supplied by the primary oil supply and which has migrated to the static component.

9. The apparatus as claimed in claim 1, wherein the rotating device is an epicyclic gear box.

10. The apparatus as claimed in claim 9, wherein the epicyclic gear box is in a planetary configuration and the rotating component of the rotating device is a planet carrier.

11. The apparatus as claimed in claim 9, wherein the epicyclic gear box is arranged axially between a turbine shaft and fan shaft of a gas turbine engine whereby to provide a speed reduction transmission from the turbine shaft to the fan shaft.

12. An assembly comprising:
a rotating device comprising:
a primary oil supply;
a rotating component; and
a static component situated radially outwardly of a center of rotation of the rotating component and arranged to collect oil held radially outwardly from the rotating component as the rotating component rotates;
an auxiliary oil apparatus for supplying oil to the rotating component, the auxiliary oil apparatus comprising:
a scoop associated with the rotating component and responsive to a change in a known parameter to move between a first position in the static component to a second position between the static component and the center of rotation, wherein the known parameter is the pressure of oil in the primary oil supply, the known parameter having two identifiable conditions, the first condition corresponding to a first oil pressure range in the primary oil supply and the second condition corresponding to a second oil pressure range in the primary oil supply.

13. The assembly according to claim 12, wherein the primary oil supply is in fluid communication with a piston slidably engaged in a cylinder arranged such that the piston moves within the cylinder responsive to pressure changes in the primary oil supply and wherein the scoop is connected to the piston such that movement of the piston causes the scoop to move between the first position and the second position.

14. The assembly as claimed in claim 12, wherein the first oil pressure range corresponds to where the primary oil supply is actively delivering oil and the second oil pressure range corresponds to a second condition where the primary oil supply is not actively delivering oil.

15. The assembly as claimed in claim 12, wherein the scoop is in fluid communication with a hose, the hose being in fluid communication with an element of the rotating component to which oil is required to be delivered.

16. The apparatus as claimed in claim 12, wherein the rotating device is an epicyclic gear box.

17. The apparatus as claimed in claim 16, wherein the epicyclic gear box is in a planetary configuration and the rotating component of the rotating device is a planet carrier.

18. The apparatus as claimed in claim 16, wherein the epicyclic gear box is arranged axially between a turbine shaft and fan shaft of a gas turbine engine whereby to provide a speed reduction transmission from the turbine shaft to the fan shaft.

* * * * *